United States Patent [19]
Kuttenberger

[10] Patent No.: US 6,526,806 B2
[45] Date of Patent: Mar. 4, 2003

(54) APPARATUS FOR OCCUPANT CLASSIFICATION IN A VEHICLE

(75) Inventor: Alfred Kuttenberger, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/047,718

(22) Filed: Jan. 16, 2002

(65) Prior Publication Data

US 2002/0138212 A1 Sep. 26, 2002

(30) Foreign Application Priority Data

Jan. 16, 2001 (DE) .......................... 101 01 656

(51) Int. Cl.[7] ............................. G01N 33/497
(52) U.S. Cl. .............................. 73/23.3
(58) Field of Search ............... 73/23.2, 23.3; 177/1, 136, 144, 210 R; 340/628, 629, 438

(56) References Cited

U.S. PATENT DOCUMENTS

| | | | |
|---|---|---|---|
| 4,259,722 A | * 3/1981 | Iwata et al. ............ | 165/42 |
| 4,905,498 A | * 3/1990 | O'Donnell et al. ..... | 180/272 |
| 6,003,511 A | * 12/1999 | Fukunaga et al. ...... | 128/202.27 |
| 6,130,614 A | * 10/2000 | Miller et al. ........... | 340/425.5 |

* cited by examiner

Primary Examiner—Eric S. McCall
Assistant Examiner—Corey D. Mack
(74) Attorney, Agent, or Firm—Kenyon & Kenyon

(57) ABSTRACT

An apparatus for occupant classification in a vehicle, which together with a respective $CO_2$ sensor serves to perform an occupant classification. Both the $CO_2$ content and the profile over time of the signals are used for occupant classification. The $CO_2$ sensors are advantageously arranged in front of the respective persons, making possible a simple measurement. The $CO_2$ sensor can also be used in each case with a further different sensor for occupant classification, and here in particular for plausibility (testing). A processor that evaluates the signals from the $CO_2$ sensors cyclically polls the $CO_2$ sensors. For plausibility, the signals from all $CO_2$ TV sensors present in the passenger compartment can also be taken into account.

7 Claims, 1 Drawing Sheet

APPARATUS FOR OCCUPANT CLASSIFICATION IN A VEHICLE

BACKGROUND INFORMATION

It is already known to use appropriate sensors in a vehicle for occupant classification. Such sensors include, for example, a seat mat, present in the vehicle seat, which furnishes data on the basis of which a weight determination and also a seat position determination for the occupant are possible. These data furthermore make it possible to ascertain whether what is present is an occupant or an object or, in particular, a child seat. A further possibility is to use an optical sensor suite to perform the occupant classification. An occupant classification on the basis of high-frequency signals is also possible, exploiting the fact that an occupant possesses a dielectric constant different from that of air. Occupant classification is necessary for an airbag for which on the one hand a determination can then be made, based on the occupant classification, as to whether an airbag can be triggered at all without injuring the occupants; and in the case of an adjustably triggerable airbag, it is possible to decide which triggering stage is optimal for the particular occupants.

SUMMARY OF THE INVENTION

The apparatus according to the present invention for occupant classification in a vehicle has the advantage that the use of a $CO_2$ sensor for occupant classification results in independence from environmental influences such as temperature and humidity. The occupant's clothing and the use of seat cushions thus also have no influence on the weight determination. The use of a $CO_2$ sensor also represents a low-cost solution, since a $CO_2$ sensor can be manufactured extremely economically on a mass-produced basis—for example, as a resistive gas sensor and thus as a semiconductor sensor.

It is particularly advantageous that from the signals of the $CO_2$ sensor it is possible on the one hand to determine the $CO_2$ quantity (on the basis of which the weight and body area can be determined), and on the other hand to determine from the time signal of the $CO_2$ sensor the respiratory frequency, in order thereby, in combination with the $CO_2$ quantity, to perform a plausibility test of the respective parameters. Also possible on the basis of the respiratory frequency, for example, is a determination as to whether a small child is present, since he or she usually exhibits a higher respiratory frequency than an adult. The occupant classification accuracy, i.e. the distinction between child and adult, can thereby be further improved.

According to the present invention, the $CO_2$ sensor is advantageously arranged very close to the occupant and also in front of him or her, so that exhaled air can be directly dynamically sensed by the $CO_2$ sensor. A very accurate measurement is then therefore possible, since the processor can then make an accurate estimate on the basis of those data.

It is moreover advantageous that the $CO_2$ sensor can be used in combination with a further sensor, for example with the seat mat, as a plausibility sensor, so as thereby to confirm or cast doubt on the signals of those other sensors.

It is furthermore advantageous that the processor cyclically polls the individual $CO_2$ sensors allocated to the respective seats, and thus continuously has data from all the sensors.

It is advantageous in this context that the processor then classifies the individual occupants based on all the signals from all $CO_2$ sensors. As a result, it can perform a plausibility check of the respective signals by way of the individual signals of the individual $CO_2$ sensors. This can be accomplished, for example, using known pattern recognition methods, or by comparison with known data sets that have been generated, for example, in preliminary tests.

DETAILED DESCRIPTION

With the use of more and more airbags in a vehicle, and especially with the introduction of airbags that can be activated in stages, it is possible to achieve occupant-adapted use of these airbags. This requires an accurate occupant classification, principally to ascertain how heavy an occupant is and thus how much restraint force must be applied in order to protect that particular occupant optimally in the event of a collision. This occupant classification is performed here, according to the present invention, with a $CO_2$ sensor.

A variety of sensor types can be used as $CO_2$ sensors. One simple and widely used sensor type is resistive gas sensors; semiconductor sensors, in particular, can be used. The resistance of these sensors changes as a function of the $CO_2$ molecules absorbed, and the $CO_2$ quantity is then measurable. Other measurement principles are, for example, an electrochemical cell, which is very accurate; or transmission sensors that detect light absorption at specific wavelengths. These wavelengths lie in particular in the infrared region, so that infrared lasers (which are also manufactured from semiconductors) and corresponding photodetectors (such as photodiodes) can then be used.

Figure 1:
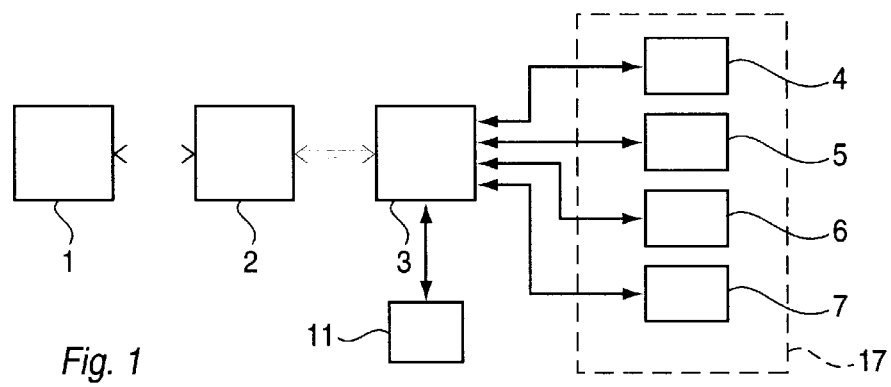
FIG. 1 shows a block diagram of the apparatus according to the present invention.

The apparatus according to the present invention is depicted as a block diagram in FIG. 1. Restraint means 1 such as airbags or belt tighteners are connected via a data input/output to a control unit 2 for restraint means 1. Control unit 2 is connected via a second data input/output to a processor 3 that evaluates signals from $CO_2$ sensors and other occupant classification sensors. Processor 3 is connected via a second data input/output to a first $CO_2$ sensor 4 that is mounted on the driver's seat. Processor 3 is connected via a third data input/output to a second $CO_2$ sensor 5 that is mounted on the passenger seat. Processor 3 is connected via a fourth data input/output to a third $CO_2$ sensor 6 that is arranged on the rear seat that is located behind the driver. Processor 3 is connected via a fifth data input/output to a fourth $CO_2$ sensor 7 that is arranged on the rear seat that is located behind the passenger seat. Processor 3 is connected via a sixth data input/output to a seat mat 11 that can be used as an occupant classification sensor. Seat mat 11 includes pressure/resistance elements whose resistance changes as a function of a pressure applied onto the seat. This seat mat 11 is therefore located in a vehicle seat of the vehicle. Sensors 4, 5, 6, and 7 are all located in passenger compartment 17.

Processor 3 cyclically polls sensors 4, 5, 6 and 7, and also 11, in order to receive corresponding measurement signals from those sensors. Sensors 4, 5, 6, and 7 include electronics which amplify, filter, and also digitize the measured $CO_2$ signals. Portions of the electronics can also be shifted into control unit 2. These digital data are then transferred to processor 3, which performs an occupant classification based on those data. Seat mat 11 is used here either as a main sensor for occupant classification (in which case one sensor is present in each seat), or seat mat 11 can also be omitted, so that only $CO_2$ sensors 4 through 7 are used for occupant classification. Seat mat 11 includes a separate control unit that determines the seat profile (which is ascertained by way of the pressure/resistance elements) and performs an evaluation of the seat profile. This reduces the tasks that control unit 1 must take on, and also the volume of data to be transferred to control unit 1.

Figure 2:
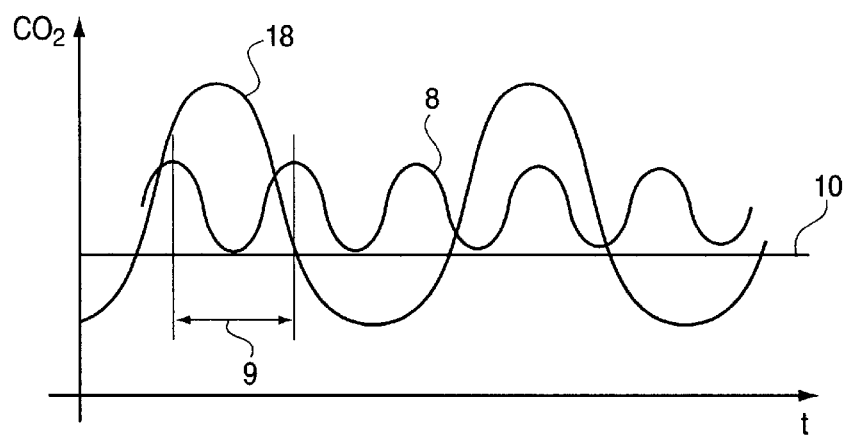
FIG. 2 shows a time diagram of the $CO_2$ signals.

FIG. 2 depicts the signals that are furnished by $CO_2$ sensors 4 through 7. A time signal 8 is sensed by sensor 7, while a time signal 18 is sensed from sensor 4, i.e. from the driver's seat. A compensated signal 10 is calculated by processor 3 from one of time signals 8 and 18, for example by summation or integration. From the amplitudes and by integration of curves 8 and 18, it is possible to determine the respective $CO_2$ quantity emitted by a certain person. From a comparison of the peaks (as determined here by spacing 9), the respiratory frequency can be determined. The amplitudes between minimum and maximum values can be determined by processor 3 by simple differentiation. Processor 3 receives curves 8 and 18 in digitized form, i.e. as sampled values.

Curve 18 shows a much greater amplitude difference than curve 8, which permits a conclusion that the person responsible for signal 18 is larger than the person responsible for signal 8. The respiratory frequency of signal 8 is also higher than that of curve 18, so it can be assumed that the cause of signal 8 is probably a child. A classification is thus possible in this fashion. If one of sensors 4 through 7 is not furnishing a time signal like one of curves 8 or 18, that seat is then probably not occupied by a person, so that deployment of airbags there can be omitted.

Integration of the time signals, in order to determine the $CO_2$ quantity emitted by a person, is also a possibility. Since the respective persons are exhaling onto the sensors associated with them, exhalation results in an elevated $CO_2$ concentration which decreases again upon inhalation. The $CO_2$ sensors must therefore be designed so that this dynamic measurement is possible; this is easy to implement with the aforesaid sensor types, however, since the respiratory frequency is on the order of seconds.

If a superimposition of the $CO_2$ discharges of different persons occurs, processor 3 can determine by way of the signals of the four sensors 4 through 7, using known methods of pattern recognition and/or signal decomposition, which person is responsible for which signals. Once the occupant classification has been performed by processor 3, processor 3 (which here acts as a control unit for the occupant classification sensors) transfers to control unit 2 for restraint means 1 the class ascertained for the occupants on the corresponding seats. If a collision sensor suite—not depicted here, but connected to control unit 2—then detects a collision, control unit 2 authorizes the deployment of corresponding restraint means 1 as a function of the occupant classification that was ascertained by processor 3, optionally in conjunction with the classification that was accomplished with seat mat 11.

Figure 3:
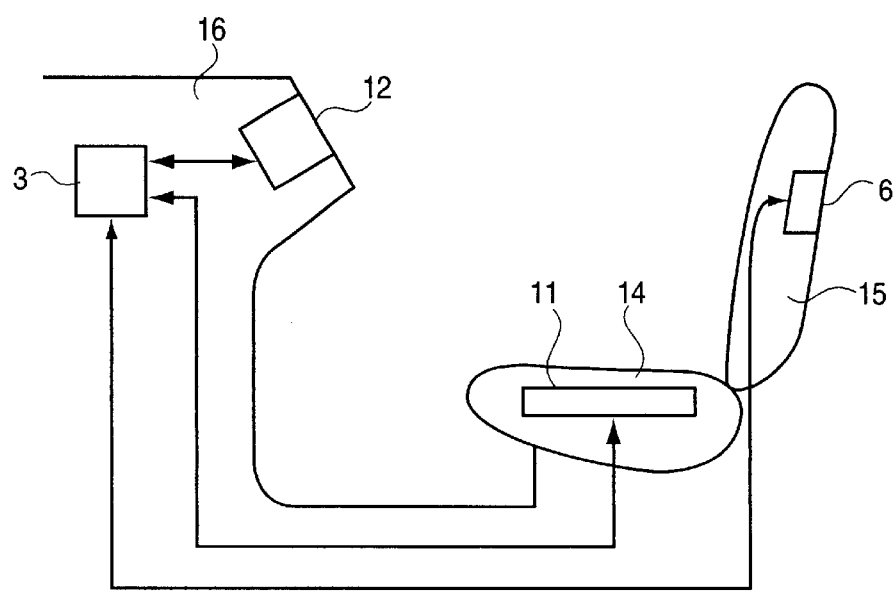
FIG. 3 shows an arrangement of the apparatus according to the present invention in the vehicle.

FIG. 3 shows, by way of example, the installation position of $CO_2$ sensors in the vehicle. A $CO_2$ sensor 12 that is present for the person who is sitting in seat 14 and leaning against seatback 15 is arranged in dashboard 16. Sensor 12 is connected via a first data input/output to processor 3. Processor 3 is connected via a second data input/output to a seat mat 11 that is located in vehicle seat 14. Processor 3 is connected via a third data input/output to a $CO_2$ sensor 6 that is present in seatback 15 of vehicle seat 14. This sensor 6 is intended for the person present on the rear seat. For the sake of simplicity, the other connections are not depicted here. Sensors 12 and 6 are arranged in such a way that a person who is inhaling and exhaling emits exhaled air onto those sensors. The local time signals caused by these persons as a result of the change in $CO_2$ content are thus easy to sense. The data input/outputs are used on the one hand to transfer the sensor values and on the other hand to poll the sensors.

What is claimed is:

1. An apparatus for occupant classification in a vehicle, the vehicle including a passenger compartment containing occupant seats, the apparatus comprising:

at least one sensor for occupant classification, the at least one sensor including a respective $CO_2$ sensor for each of the occupant seats in the passenger compartment; and a processor connected to the $CO_2$ sensor for performing a weight determination as a function of a signal of the $CO_2$ sensor.

2. The apparatus according to claim 1, wherein the processor performs the weight determination from a $CO_2$ content.

3. The apparatus according to claim 1, wherein the processor determines a respiratory frequency of an occupant from a profile over time of the signal.

4. The apparatus according to claim 1, wherein the respective $CO_2$ sensor is situated in front of the respective vehicle seat in the passenger compartment.

5. The apparatus according to claim 1, wherein the at least one sensor further includes at least one, non-$CO_2$ sensor used in combination with the $CO_2$ sensor for occupant classification.

6. The apparatus according to claim 1, wherein the at least one sensor includes a plurality of $CO_2$ sensors in the passenger compartment, the processor cyclically polling the $CO_2$ sensors.

7. The apparatus according to claim 6, wherein, for the occupant classification, the processor takes into account signals of all of the $CO_2$ sensors present in the passenger compartment.

* * * * *

UNITED STATES PATENT AND TRADEMARK OFFICE
CERTIFICATE OF CORRECTION

PATENT NO. : 6,526,806 B2
DATED : March 4, 2003
INVENTOR(S) : Alfred Kuttenberger It is certified that error appears in the above-identified patent and that said Letters Patent is hereby corrected as shown below:

<u>Title page,</u>
Item [57], ABSTRACT,
Line 11, delete "TV"

<u>Column 4,</u>
Line 45, change "one, non-CO$_2$" to -- one non-CO$_2$ --

Signed and Sealed this

Seventeenth Day of February, 2004

JON W. DUDAS
*Acting Director of the United States Patent and Trademark Office*